United States Patent

Svennevik et al.

[11] Patent Number: 5,710,882
[45] Date of Patent: Jan. 20, 1998

[54] METHOD AND CALL SET UP SERVER FOR SETTING UP A CALL USING A CALL HANDLING PORTION AND A CONNECTION HANDLING PORTION TO HANDLE THE CALL AND THE CONNECTION, RESPECTIVELY

[75] Inventors: Anders C. Svennevik, Stockholm; Stefan R. Lundberg, Tyresö, both of Sweden

[73] Assignee: Telefonaktiebolaget LM Ericsson, Stockholm, Sweden

[21] Appl. No.: 496,669

[22] Filed: Jun. 29, 1995

[51] Int. Cl.[6] .................................................. G06F 13/00
[52] U.S. Cl. ........................ 395/200.12; 395/200.14; 395/200.15; 395/200.2; 364/222.2; 364/242.5
[58] Field of Search .................. 395/200, 200.12, 395/200.14, 200.15, 200.2; 364/200, 900, 222.2, 242.5; 370/58, 85, 56, 79

[56] References Cited

U.S. PATENT DOCUMENTS

| | | | |
|---|---|---|---|
| 4,903,258 | 2/1990 | Kuhlmann et al. | 370/58.2 |
| 4,955,019 | 9/1990 | Mizuhara et al. | 370/85.7 |
| 5,018,097 | 5/1991 | Kuhlmann et al. | 364/900 |
| 5,047,923 | 9/1991 | Elstner et al. | 364/200 |
| 5,081,623 | 1/1992 | Ainscow | 370/85.4 |
| 5,422,883 | 6/1995 | Hauris et al. | 370/62 |
| 5,436,898 | 7/1995 | Bowen et al. | 370/79 |
| 5,453,984 | 9/1995 | Mueller | 370/85.13 |
| 5,539,886 | 7/1996 | Aldred et al. | 395/200 |
| 5,550,802 | 8/1996 | Worsley et al. | 370/13 |
| 5,553,071 | 9/1996 | Aranguren et al. | 370/85.3 |
| 5,566,169 | 10/1996 | Rangan et al. | 370/56 |

FOREIGN PATENT DOCUMENTS

| | | | |
|---|---|---|---|
| 0 591 940 | 4/1994 | European Pat. Off. | H04L 12/40 |
| 93/16544 | 8/1993 | WIPO | H04M 3/42 |

OTHER PUBLICATIONS

Jeffrey Fritz, *Video Connections*, BYTE, May 1995, at 113, 116.

*Primary Examiner*—Thomas C. Lee
*Assistant Examiner*—Ki S. Kim
*Attorney, Agent, or Firm*—Burns, Doane, Swecker & Mathis, L.L.P.

[57] ABSTRACT

A communication system is provided for transferring broadband multimedia data through a network. The system includes network terminals, a transmission backbone, and a call set-up server. The call set-up server controls call handling and connection handling or channel allocation. Channel allocation is handled separately from call control, enabling upgrading of connection handling hardware and software without affecting the rest of the system.

6 Claims, 10 Drawing Sheets

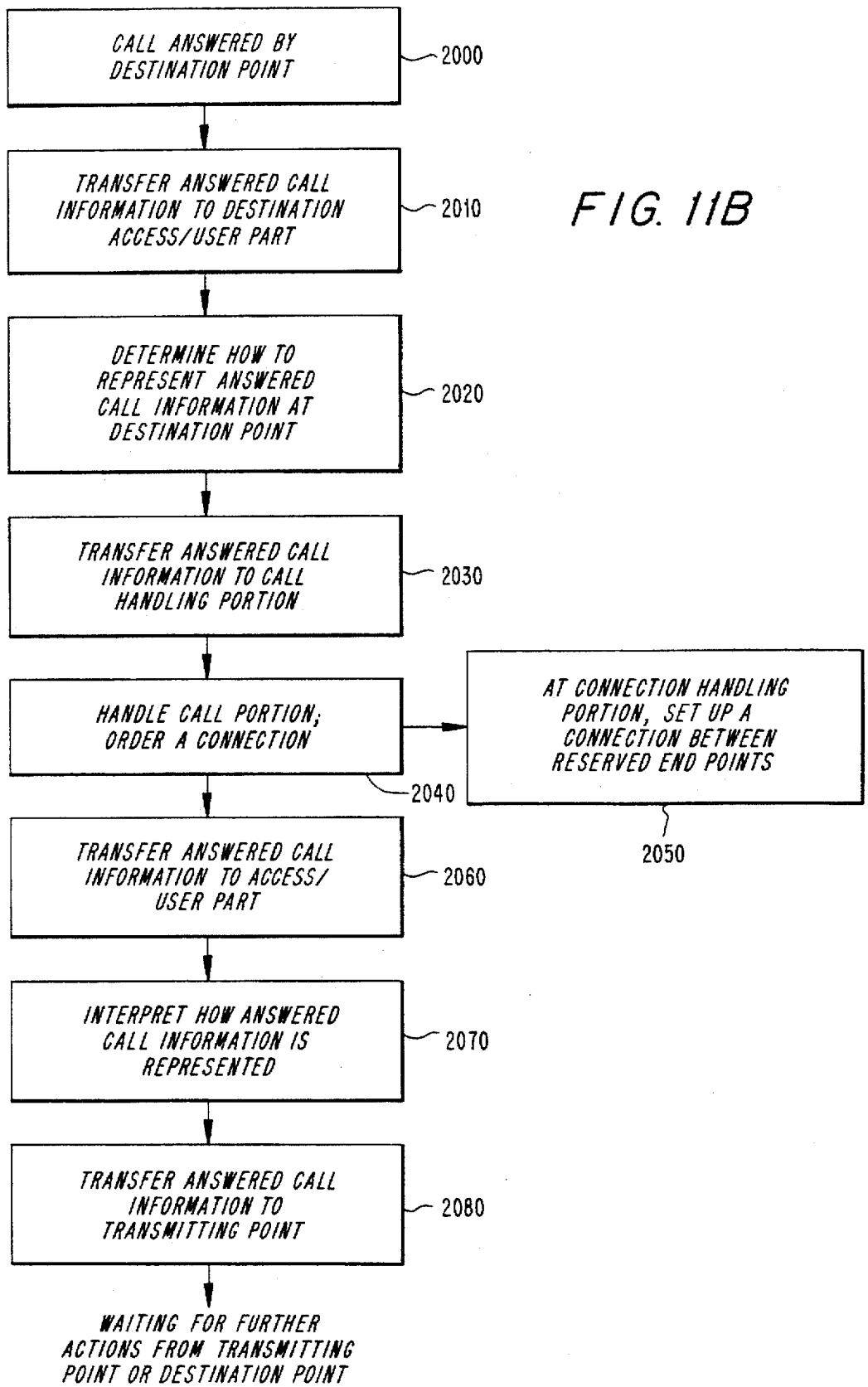

METHOD AND CALL SET UP SERVER FOR SETTING UP A CALL USING A CALL HANDLING PORTION AND A CONNECTION HANDLING PORTION TO HANDLE THE CALL AND THE CONNECTION, RESPECTIVELY

BACKGROUND

With the advent of multimedia technology, there is a demand for a system which supports multimedia applications on a network, for example a Local Area Network (LAN). Such a system would need to transfer digital audio and video data quickly and easily across the LAN.

One system which provides multimedia applications on a network is the Isochronous Ethernet or IsoEthernet. The IsoEthernet is a new LAN access technology specified by the IEEE 802.9 committee which enables digital audio and video data to be sent easily across a LAN. The IsoEthernet overcomes the bandwidth and data transfer rate constraints of a LAN and enables isochronous transmission of data at fixed intervals with little or no delay, within a LAN, which is referred to as an Isochronous LAN or IsoLAN. The IsoEthernet enables video and audio traffic to be transferred easily across a LAN for such multimedia applications as video conferencing, interactive presentations, etc.

The IsoEthernet is compatible with the 10BasetT ethernet in the 10 Megabits per second packet mode. The 10BaseT is the most common ethernet and uses an unshielded twisted pair of wires as physical media. The IsoEthernet is easy to install by inserting a new network interface card (NIC) and replacing or upgrading a hub. No rewiring is necessary, and the resulting network can still handle traditional packetized data.

A LAN with IsoEthernet user access is called an IsoEthernet system. An example of an IsoEthernet system is depicted in FIG. 1. According to FIG. 1, two IsoEthernet terminals 100 can communicate with each other or with a public network through a communication system 105. The IsoEthernet terminal 100 is a personal computer (PC) with an IsoEthernet Network Interface Card (NIC) that is used for various multimedia applications, e.g. video conferences. A plurality of IsoEthernet terminals 100 are commonly used in an IsoEthernet system, as depicted in FIG. 1. The communication system 105 typically employs structured software to control the communication between the terminals 100 and the public network, which includes the transfer of multimedia data as well as the ordering and interaction of services such as call forwarding, multimedia interactive conferencing, etc.

There are several problems that arise due to the use of the structured software in the communication system 105. One problem is how to separate the behavior of the terminal and the interface from the service ordered via the interface, so that a new terminal can be added, without affecting the existing service. Another problem is how data should be transferred between the parties.

Yet another consideration is how new services can be added or how old services can be removed or modified, or new access parts can be added without affecting the existing services or access parts. For instance, a new service may not be able to be added without affecting already implemented services, which complicates the interactions between services. Similarly, removing services and adding or removing access parts may affect already implemented services and access parts.

SUMMARY

It is therefore an object of the invention to provide a multimedia network which easily transmits audio and video data while permitting connection handling hardware software and supplementary services to be easily upgraded and modified.

According to the invention, a system is provided which permits the transfer of broadband multimedia data through a network. The system includes network terminals, a hub, a network management system, and a call set-up server. The call set-up server controls call handling and connection handling.

According to one aspect of the invention, the call set-up server includes an access part, a user part, and a central part. The central part sets up a call between parties in the system and operates independently from the access part and the user part. This enables a new access part to be added without affecting the existing central part.

According to a second aspect of the invention, the call set-up server controls call handling separately from connection handling. This enables upgrading of connection handling hardware and software without affecting the rest of the system.

According to a third aspect of the invention, the call set-up server includes a service pointer, in addition to an access part, a user part, and a central part. The service pointer permits supplementary services to be added, removed or modified and permits access parts to be added or modified, without affecting already existing services and accesses.

BRIEF DESCRIPTION OF THE DRAWINGS

The invention will now be described by way of reference to the exemplary embodiments shown in the accompanying drawings, in which:

FIGS. 11A and 11B are flow charts illustrating how a call is transferred between a transmitting point and a destination point, and how an answer is transferred from the destination point to the transmitting point, according to the present invention.

DETAILED DESCRIPTION

Figure 1:
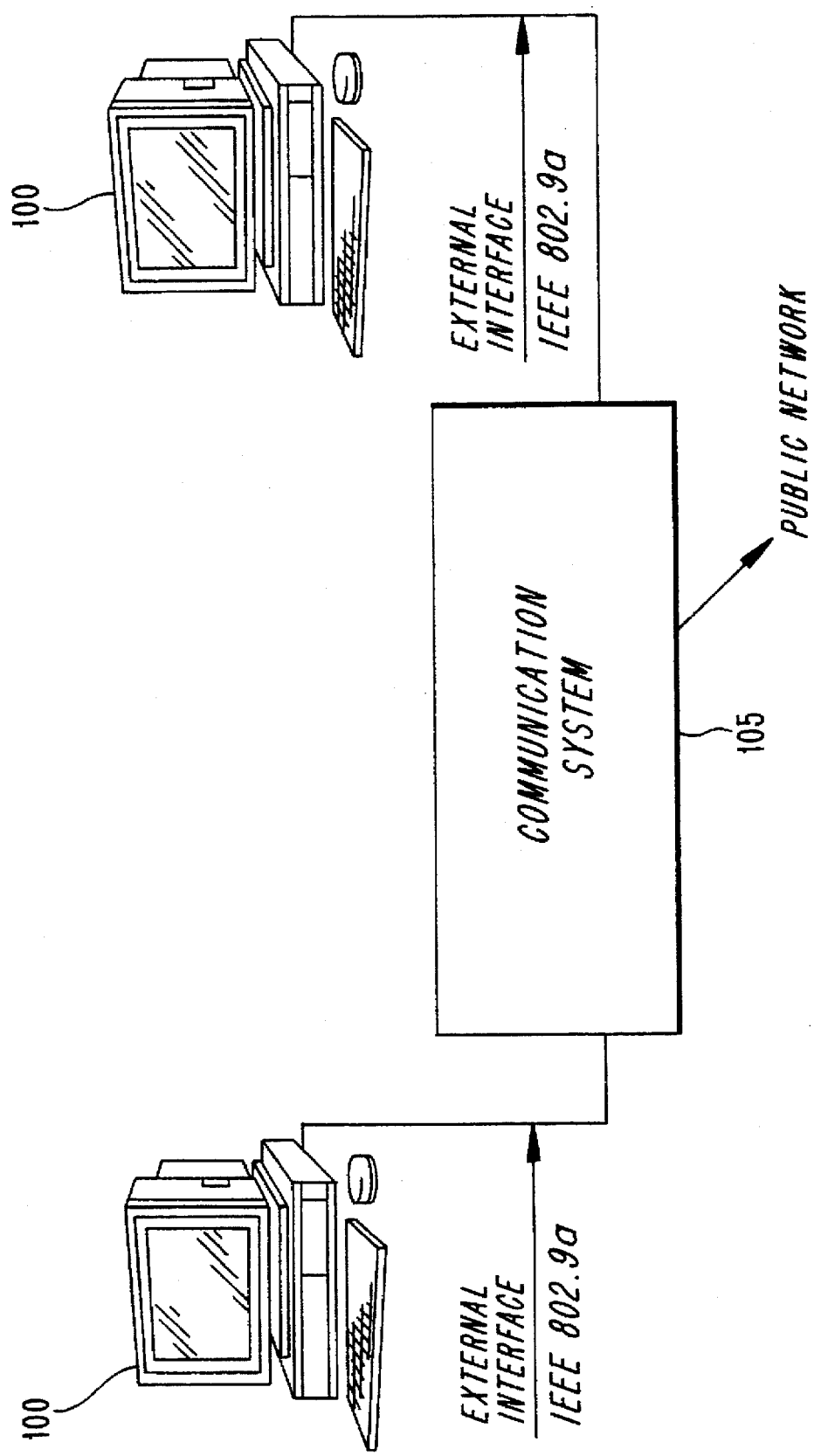
FIG. 1 depicts a conventional multimedia communication system.
Figure 2:
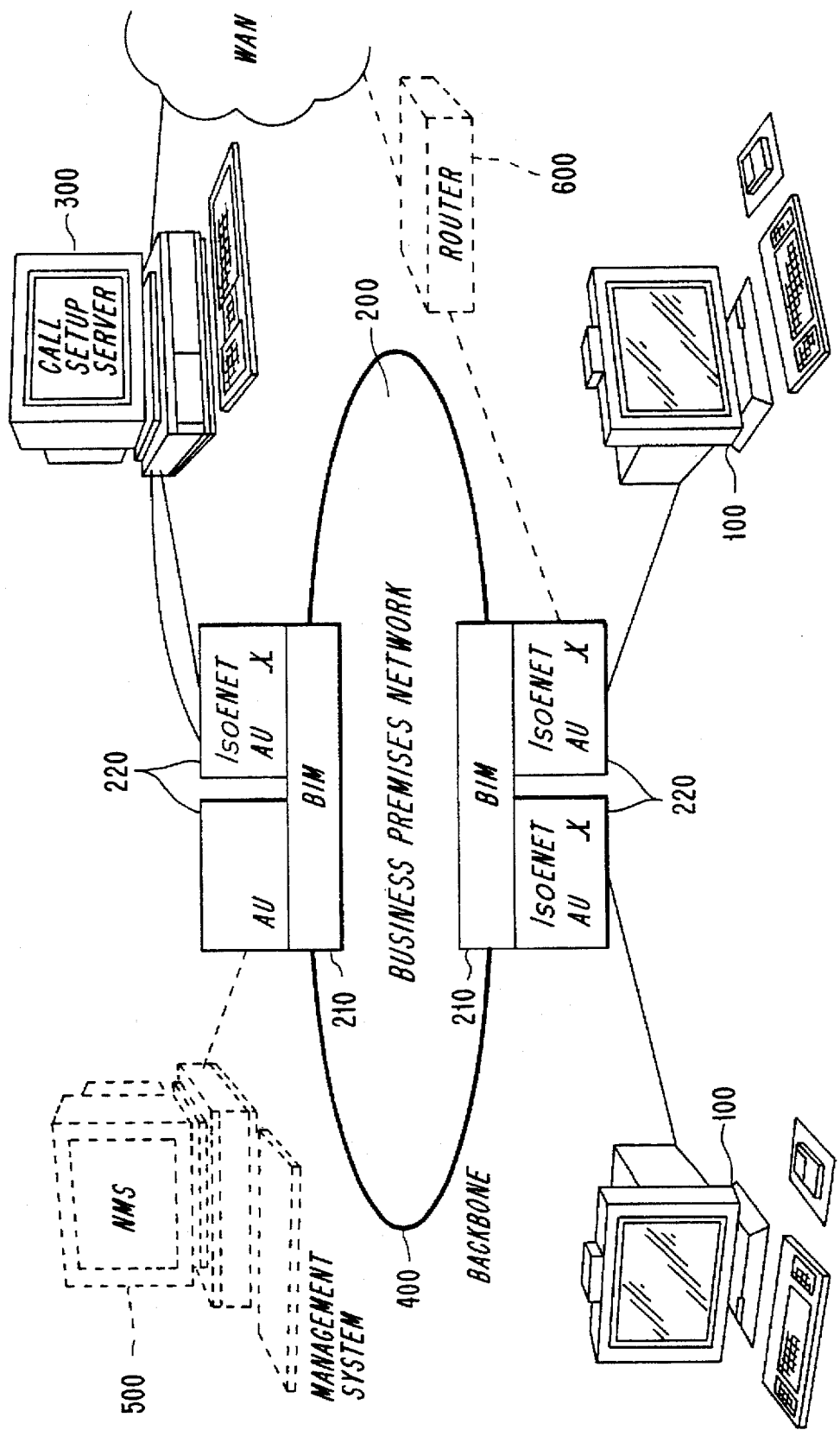
FIG. 2 depicts a multimedia communication system according to the present invention.

An IsoEthernet system according to the present invention is illustrated in FIG. 2. The IsoEthernet system is divided into three main parts: the IsoEthernet terminal 100, the IsoEthernet hub 200, and the call set-up server 300. The IsoEthernet terminal 100 is the same type of terminal used in the communication system depicted in FIG. 1. A plurality of IsoEthernet terminals may be used in the IsoEthernet system, however only two are shown in FIG. 2 for simplicity of illustration.

The IsoEthernet hub 200 consists of a Business Premises Network (BPN) hub including at least one Broadband Interface Module (BIM) 210 with IsoEthernet terminals 100 connected to it. Two BIMs are shown in FIG. 2 for illustrative purposes, however one or several BIMs may be included in a BPN hub. The BIM 210 is connected to other BIMs across the transmission backbone 400, which may be, for example, a twisted pair of wires.

The BIM 210 contains an access unit (AU) 220 and a control module. The AU 220 includes switches manipulated by the call set-up server 300 for separating the call control signalling information from the data signalling information and handling the transport of data.

The call set-up server 300 handles call control for the isochronous part of the IsoEthernet. The call set-up server 300 is connected to the IsoEthernet hub 200 via both the normal ethernet and the IsoEthernet. The ethernet connection is used to transport the call control signalling information and to connect and disconnect the switches in the AU 220. The IsoEthernet connection is used as a data path for routing IsoEthernet calls to or from the ISDN/Wide Area Network (WAN) and within the BPN hub.

Also included in the IsoEthernet system is a Network Management System (NMS) 500 and a router 600. The NMS 500 operates in conjunction with a management application in the call set-up server 300 to manage the network. The router 600 routes Ethernet packet data traffic over the WAN.

A main purpose of the call set-up server 300 is to control isochronous circuit-switched variable bandwidth calls over the Business Premises Networks (BPN). The call set-up server 300 controls and routes calls based on the information in the signalling channels of the user and network interfaces, and connects/disconnects the calls by operating the switches in the AU 220 of the BIM 210.

During call set-up by the call set-up server 300, a destination number is analyzed to determine if it is a valid number. To reach the destination in the IsoLAN or the WAN, resources are reserved and allocated, and the switches are controlled to connect the call. In the case of a call to the WAN, the user categories are checked to see if the requested call is allowed to be set up.

The call set-up server 300 can be hosted on a PC with an OS/2 operating system or other operating systems. The call set-up server in an IsoEthernet system consists of software and dedicated hardware. The PC platform provides the general hardware. The software can be implemented in Erlang and ANSI C, or other programming languages can be used. Most of the traffic and management applications are typically written in Erlang. The hardware drivers, some protocol stacks and the Erlang emulator are typically written in C.

The call set-up server is a vital part of the IsoEthernet system. It controls calls from one IsoEthernet terminal to another IsoEthernet terminal, or from an IsoEthernet terminal to a terminal in the WAN, and vice versa.

Figure 3:
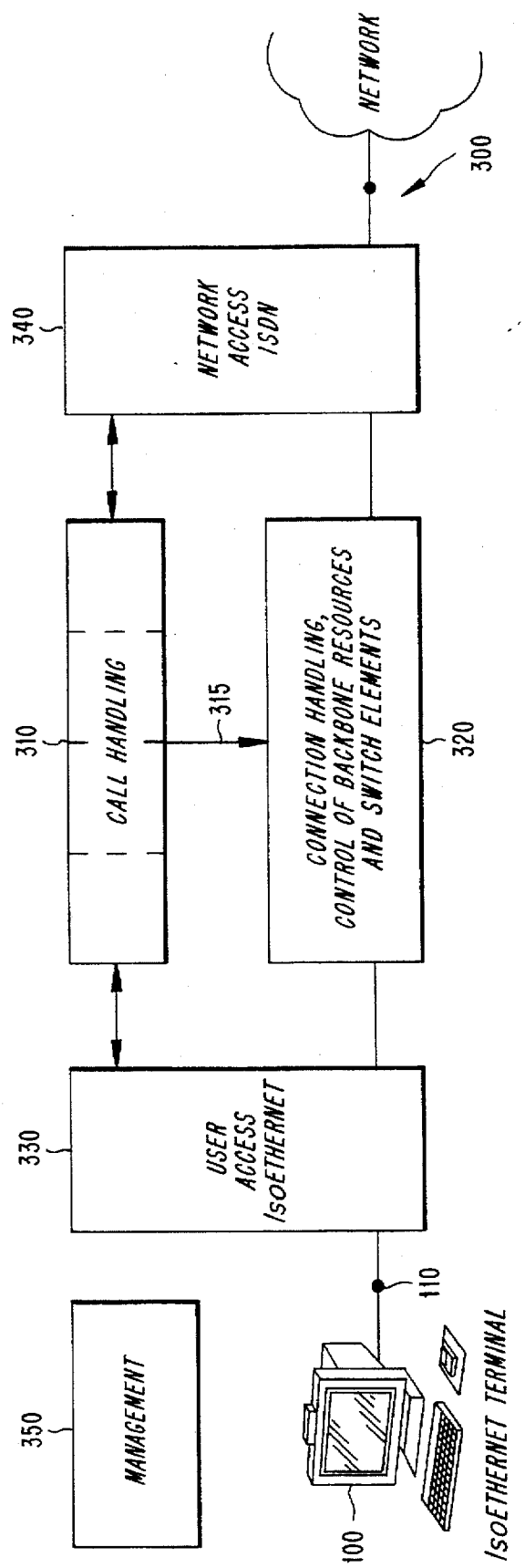
FIG. 3 is a simple model of the functionality of a call set-up server according to the present invention.

FIG. 3 depicts a simple model of the functionality of the call set-up server 300. Referring to FIG. 3, the call set-up server 300 includes a call handling portion 310, a connection handling portion 320, a user access portion 330, a network access portion 340, and a management portion 350. The call handling portion 310 controls the call itself and orders connections from the connection handling portion 320 via interface 315. Currently, the call set-up server 300 provides basic call handling with variable bandwidth for IsoEthernet users and ISDN network calls. Future call handling modules may contain supplementary call handling functionality.

The user access portion 330 and the network access portion 340 facilitate communication between a user and a network, e.g., a WAN. The user access portion 330 and network access portion 340 include the access related parts and user related parts for the user and network, respectively. The user access portion is connected to the IsoEthernet terminal 100 via an interface 110. Currently, an ISDN network access with inverse multiplexing, i.e. bonding of separate channels together to provide a wide bandwidth, is supported by the call set-up server 300, offering synchronization of more than one channel. Future versions will support more ISDN dialects.

The connection handling portion 320 contains a map of the local transport network and routing information to other networks. Upon request from the call handling portion 310, with the help of connection reference points, required bandwidth, and quality of service, the connection handling portion 320 reserves and connects a path between the two endpoints of a call through the network. It is possible to disconnect an established connection and still keep the allocated resources reserved. It is also possible to release the reserved resources.

The connection handling portion 320 also controls the connection of the equipment and the switches. The connection handling portion 320 consists of a generic part and infrastructure specific parts specifically implemented for the BIMs.

The user access and connection handling functions are divided between the call set-up server 300 and the AU 220. The AU 220 separates the call control signalling from the connection (data path) and forwards the signalling to the call set-up server 300. The connection handling portion 310 in the call set-up server 300 operates the switches in the AU 220.

Figure 4:
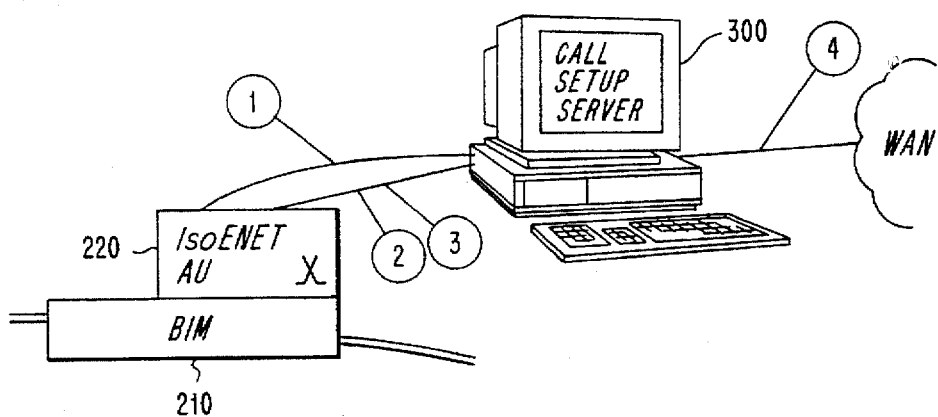
FIG. 4 depicts the interfaces of the call set-up server according to the present invention.

The call set-up server 300 has several logical interfaces, as depicted in FIG. 4. Interface 1 is a D-channel signalling interface according the IEEE 802.9a IsoEthernet specification, incorporated herein by reference. Interface 1 provides a connection to the user terminals 100 in the network and a control interface to the access unit hardware used for switch control according to IsoEthernet access unit protocol. Interface 2 is a management interface to the NMS 500. Interface 2 provides supports Simple Network Management Protocol (SNMP) for system monitoring and Proprietary Management Protocol (PMP) for configuration of the system and its extensions. On both interfaces 1 and 2, Transmission Control Protocol/Internet Protocol (TCP/IP) on ethernet is used to transport the information.

The call set-up server 300 also includes interfaces 3 and 4. Interface 3, which is physically part of interface 2, is a B-channel connection from the call set-up server 300 to the access unit 220 for the WAN traffic, using the isochronous part of the IsoEthernet. Interface 4 is a connection from the call set-up server 300 to the WAN.

Figure 5:
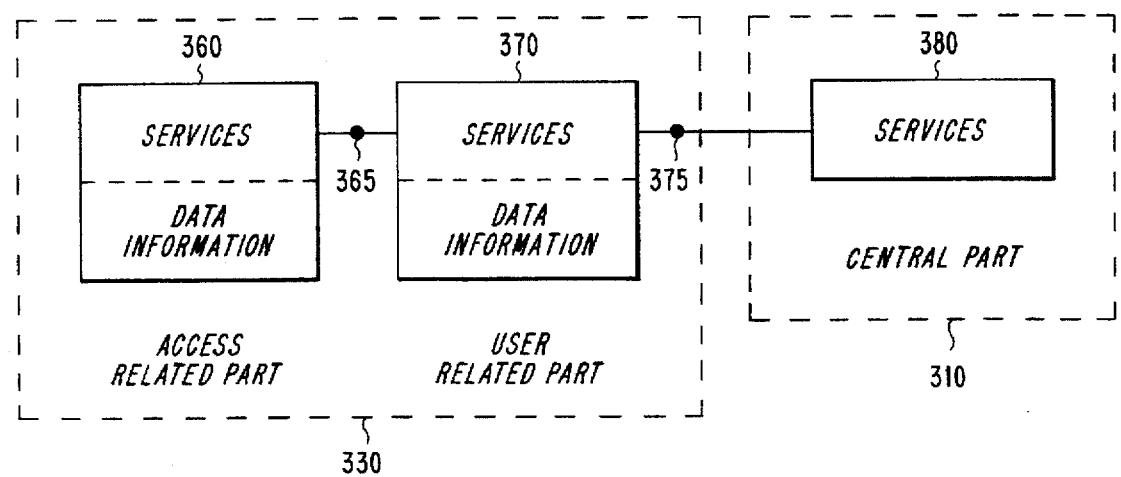
FIG. 5 shows the software architecture of the call set-up server according to a first aspect of the invention.

FIG. 5 shows the software architecture of the call set-up server 300 according to a first aspect of the present invention. The call set-up server software architecture includes three fundamental entities: the access related part 360, the user related part 370 and the central part 380. The access related part 360 and the user related part 370 are part of the user access portion 330. The central part 380 is part of the call handling portion 310.

The access related part 360 represents the physical equipment. It contains data information and information about call services. The data information represents the physical equipment used by the user and enables the access related part to communicate with the equipment. The data information also includes interface resource information and information corresponding to all levels of the communication protocol and the behavior of the external equipment as seen by the system. The service information enables the access related part to handle ordering a service and determining how a reply should be represented to the terminal. The access related part 360 first handles the external interface, then handles the terminal's behavior. The access related part 360 terminates the interface protocol and controls the resources or channels in the interface.

The user related part 370 represents the user and handles restrictions on the user to order services. It contains data information and service information. The data information represents the user and includes information such as the directory number and categories. The user related part 370 uses the service information to perform the user dependent part of a service. The user related part 370 is related to the equipment the user uses, and selects a service based on the information it contains and the signalling from the terminal. The user related part 370 performs independently of the behavior and characteristics of the access related part 360.

The central part 380 contains information about the service which is independent of the data information representing the behavior and characteristics of the physical equipment and user. The central part is not affected when new user and access related parts 360, 370 are added or removed. The central part 380 controls the call itself and orders connection and disconnection of the data path in the connection handling. This part orders the connection between entities irrespective of what the entities represent.

Connecting the access related part to the user related part and the user related part to the central part are predetermined interfaces, 365 and 375, respectively. These interfaces contain software that permits interaction between the parts. The interfaces also prevent functions to be carried out in the wrong parts, e.g. the interfaces avoid functions dedicated to the access part from being carried out in the user part, and vice versa.

The software architecture of the call set-up server according to the first aspect of the present invention, as depicted in FIG. 5, permits the central part 380 to set up a call between parties in the system independently from the access part 360 and the user part 370. This architecture permits the service to handled simply, without having to take into consideration the characteristics and behavior of the access part and the user part. Additionally, according to the first aspect of the invention, when a new access is added to the system and this access has the same functional behavior as an existing access, only a new access part needs to be developed to handle the new access, and the existing user and central parts may be re-used for the new access part. If the new access has a different functional behavior than an existing access, a new access part and a new user part must be developed to handle the new access, but the existing central part may be re-used for the new access part.

According to a second aspect of the invention, communication between two parties is divided into two parts—the call and the connection. As explained above with reference to FIG. 3, the call is the actual data that is transmitted between the parties, which is handled by the call handling portion 310. The connection is the route through the system that the data takes, which is handled by the connection handling portion 320.

Figure 6:
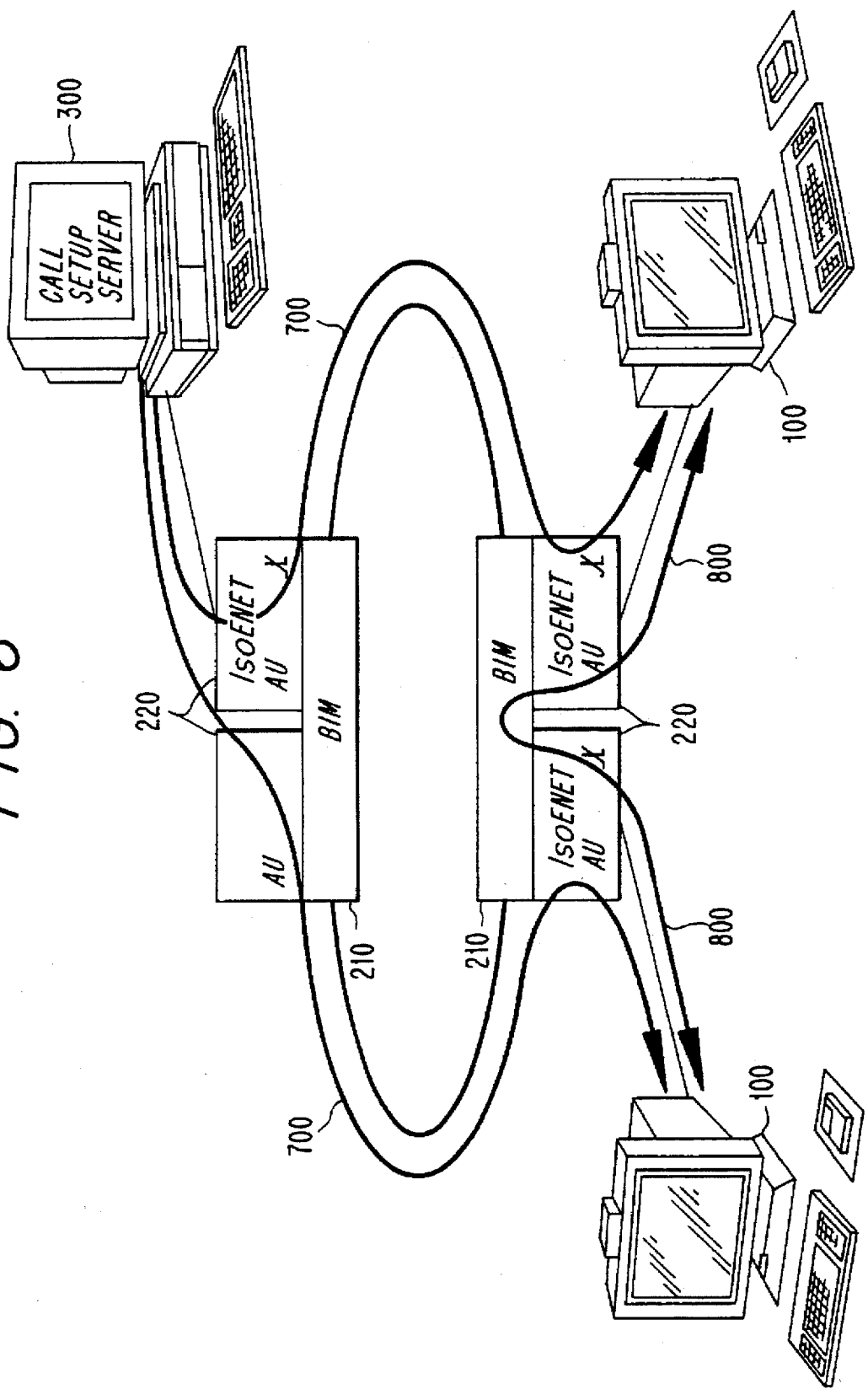
FIG. 6 depicts a call path and a connection path in an IsoEthernet system according to a second aspect of the invention.

As depicted in FIG. 6, the call may take the path 700 through the network, and the connection may take another path 800. This implies that call handling and connection handling must be handled separately in a system.

Figure 7:
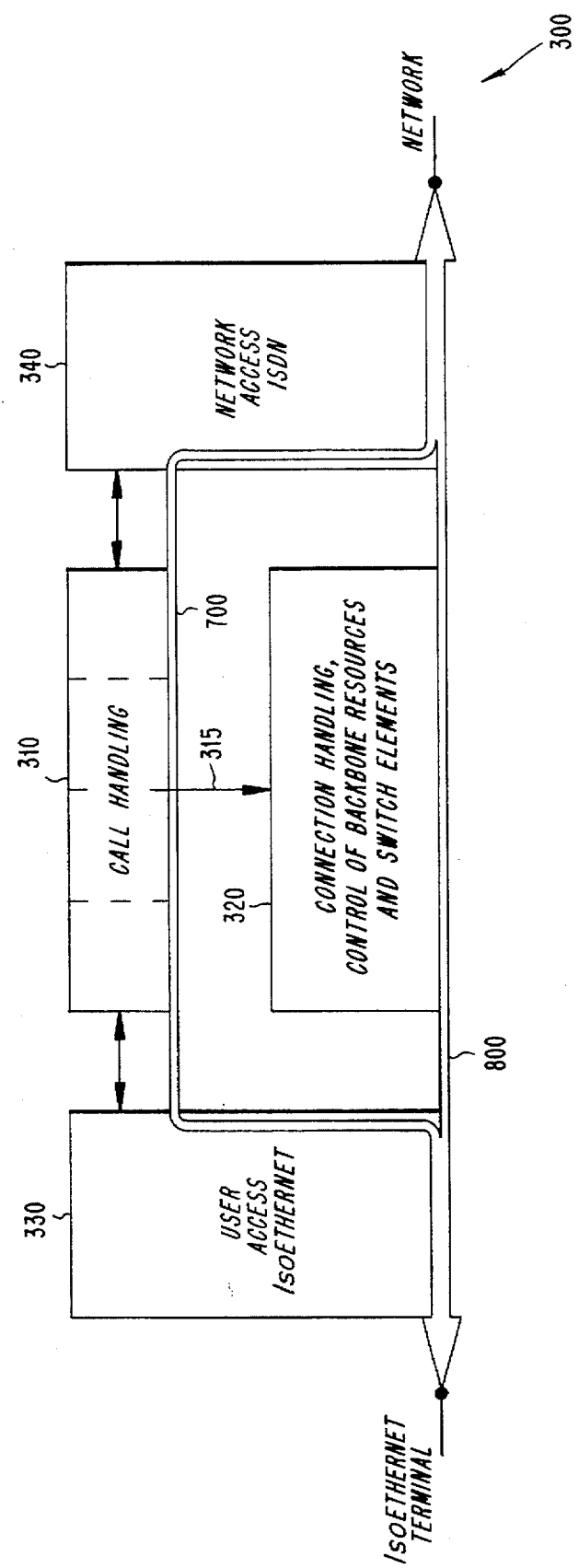
FIG. 7 depicts a functional view of the call path and connection path in a call set-up server according to a second aspect of the invention.

FIG. 7 depicts a functional view of the separation of the call path 700 and the connection path 800 inside the call set-up server 300, according to a second aspect of the invention. When a call has been set up, a channel of physical equipment is needed to transfer data between the two parties. The channel should be independent of the rest of the system, enabling upgrading of the channel hardware and software without affecting the rest of the system.

According to a second aspect of the present invention the connection handling portion 320, also referred to as a channel allocator, is provided for this purpose. The connection handling portion 320 has a map of the transport network and routing information for the other parts of the transport network. It controls the connection to the equipment and uses the map to establish the connection of one half of the call, e.g. the sending end, to the other half of the call, e.g. the receiving end. With the help of the connecting reference points for the involved parties, the connection handling portion 320 routes the call within the network. Also, together with the requested bandwidth and the timeslots used in time domain multiplexed interfaces, the connection handling portion 320 dynamically reserves and connects bandwidths in the transmission backbone 400.

When the system is configured, the physical connection point for each external interface is given an identity. This identity is stored by the call handling portion 310 when ordering a channel. The identity is not interpreted by the call handling portion 310, but rather is transmitted from the call handling portion 310 to the connection handling portion 320 across interface 315 when a data path is established. The identity is then interpreted by the connection handling portion 320. By transmitting the identity to the connection handling portion 320 for interpretation, upgrading of connection handling can be performed without affecting call control.

The interface 315 between the call handling portion 310 and the connection handling portion 320 must hide the details of the internal workings of the connection handling portion 320. The interface 315 facilitates following operations: reserve a channel between the given identities with the given quality, connect the reserved channel, revert the state of the channel to reserved, and free the channel, without requiring the call handling portion 310 to deal with the internal aspects of the physical connections set up by the connection handling portion 320.

As explained above, the second aspect of the invention, as depicted in FIGS. 6 and 7, separates the call handling path from the connection handling or channel allocating path. This enables upgrading of connection handling hardware and software without affecting the rest of the system.

Figure 8:
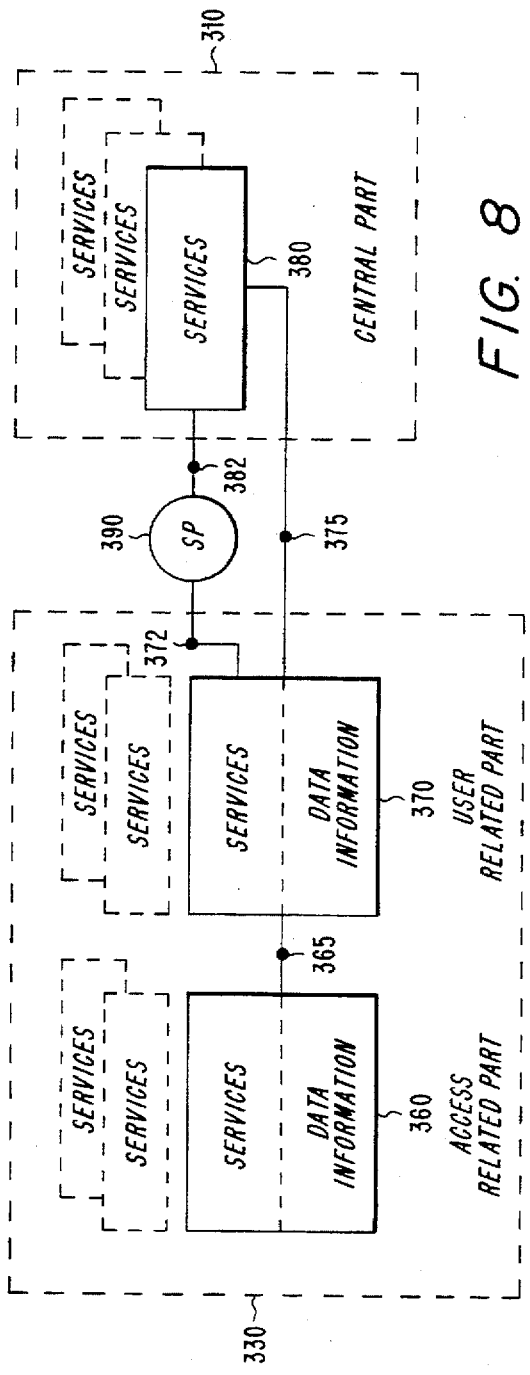
FIG. 8 depicts the software architecture of the call set-up server according to a third aspect of the present invention.

According to a third aspect of the invention, an additional element is added to the architecture of the call set-up server 300. As depicted in FIG. 8, a service pointer (SP) 390 is added to the call set-up server software architecture to enable new services to be added to the system, old services to be removed or modified, and to enable interaction between the services. The service pointer 390 is a separate element from the user access part 330 and the call handling portion 310, but it is connected to the user related part 370 via interface 372 and to the central part 380 via interface 382. The interfaces 372 and 382 contain software which permits interaction of the service pointer 390 with the user part 370 and the central part 380. The dotted lines in FIG. 8 represent services.

The service pointer 390 is used together with the user related part 370 to choose the relevant service to be executed. The service pointer 390 will always start a new central part 380, one per requested service. The service pointer 390 may also start parts in the access or user related parts, 360 and 370, if needed, for example, if information to the terminal is to be presented in a new manner or the behavior of the user must be modified such as supervising it to determine when it becomes free. Since the service pointer is not interfaced directly to the access related part 360, new access parts can be added without informing the service pointer. Since the service pointer 390 is interfaced directly with the central part 380, it can control interactions between the services or central parts, represented by dotted lines in FIG. 8, without affecting the rest of the system.

The service pointer according to a third aspect of the present invention supports functional, structural, and implementation dependent interactions. Functional interactions are specified in standards which are independent of the implementation used. Structural interactions depend on the architecture used. Implementation dependent interactions may occur if code is written without regard to future developments or if the code is used for more than one purpose. The service pointer 390 handles these interactions independently of each other. Since the structure of the call set-up server software architecture, as depicted in FIG. 8 is simple, the number of structural interactions is lessened compared to earlier systems. Furthermore, as each service is implemented independently of all others, the number of implementation dependent interactions will decrease. The service pointer is thus able to permit supplementary services to be added, removed or modified, permits access parts to be added or modified, without affecting already existing services and access parts, and enables services to interact with each other without affecting the rest of the system. Additionally, the new access parts can be added without informing the service pointer.

One principle common to all aspects of the present invention, is the "half-call principle", in which a call is divided into two halves, and each access in the call is assigned its own half call for traffic control. The call handling is thus implemented as two half calls. The half calls communicate by using a peer-to-peer protocol, called the call dialogue.

Figure 9:
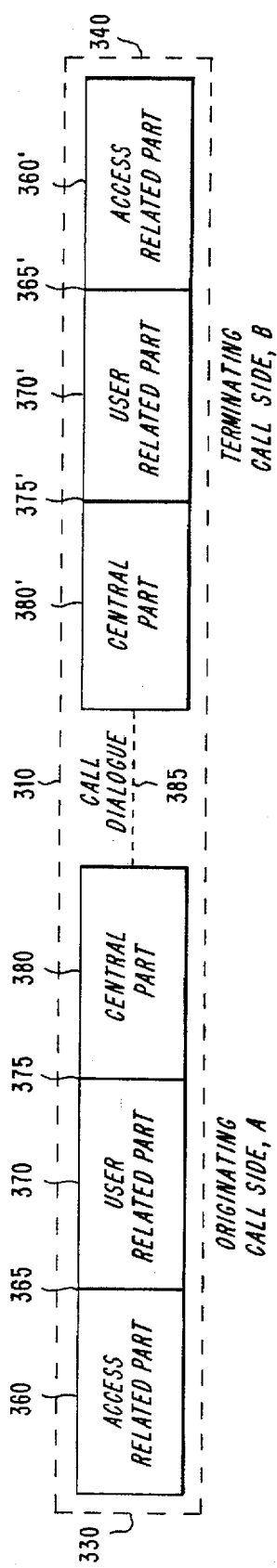
FIG. 9 depicts call set-up server software architecture employing the half call principle according to the present invention.

FIG. 9 depicts an example of the software architecture of the call set-up server employing the half call principle. The network traffic is divided into two half calls, one for WAN, and one for IsoEthernet. The two call halves communicate with a call dialogue 385. As depicted in FIG. 9, the use of call halves is intrinsic to the call set-up server architecture. The traffic application is always divided into two call halves, the originating call side, A, and the terminating call side, B. For the purposes of illustration, the originating call side, A, and the terminating call side, B, are depicted in FIG. 9 as referring to the IsoEthernet half call and the WAN half call, respectively. The IsoEthernet half call parts include an access part 360, an interface 365, a user part 370, an interface 375, and a central part 380. The WAN half call parts include an access part 360', an interface 365', a user part 370', an interface 375', and a central part 380'. The IsoEthernet half call parts 360 and 370 are part of the user access portion 330. The WAN half call parts 360' and 370' are part of the network access portion 340. Both central parts 380 and 380' are part of the call handling portion 310, and communicate with each other across a call dialogue interface 385.

The half-call principle is important because it avoids constantly increasing the complexity of existing telecommunication applications and functions when adding a new application or function. Also, the half-call principle minimizes the problem of interaction between supplementary services when the different parties in a call use these services.

Figure 10:
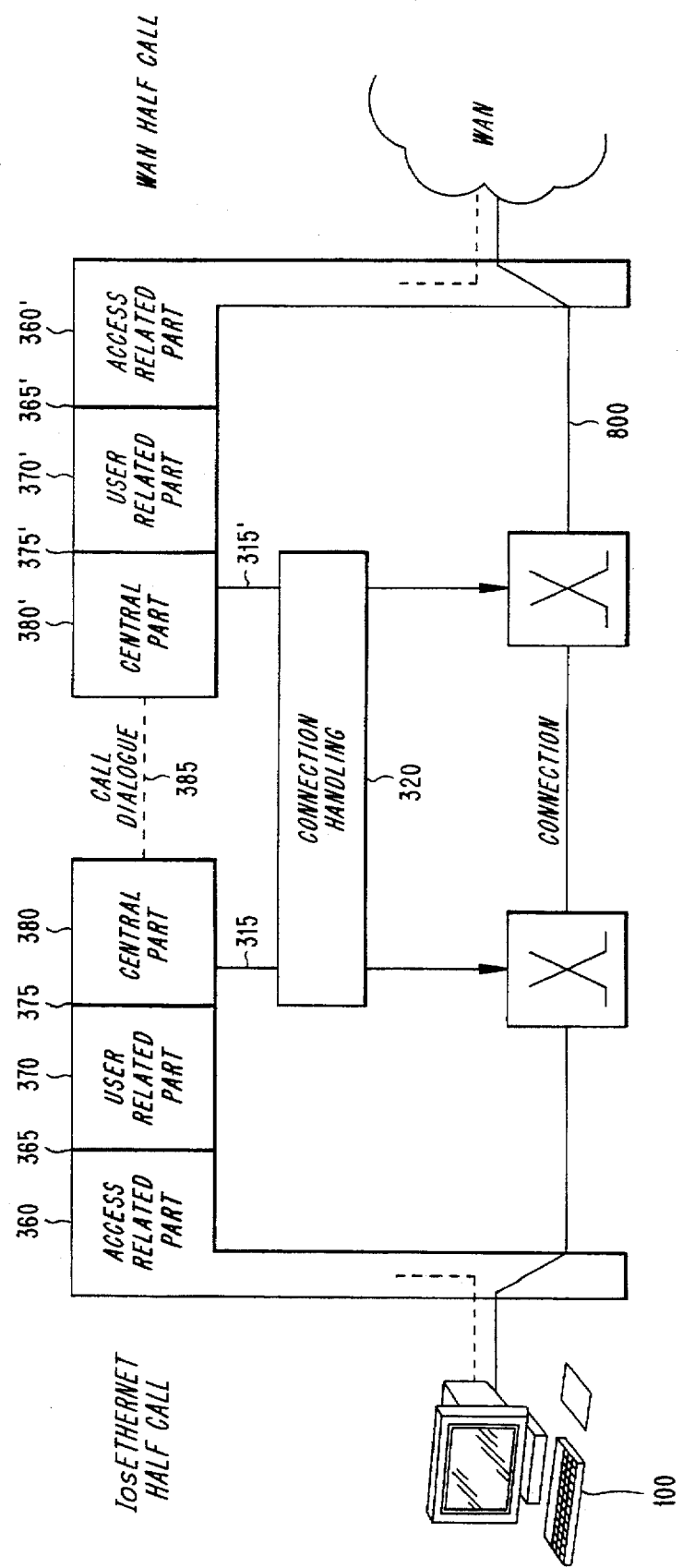
FIG. 10 depicts a functional view of the half call principle in a network, from a call set-up server perspective, according to the present invention.

FIG. 10 depicts a functional view of the half call principle in a network, from a call set-up server perspective. Two types of calls are controlled, a call from an IsoEthernet terminal 100 to an IsoEthernet terminal 100, using two IsoEthernet half calls, and a call from an IsoEthernet terminal 100 to a WAN terminal, and vice versa, using one WAN half call and one IsoEthernet half call.

Different parts are provided for the access parts in the IsoEthernet half call and the WAN half call. In the IsoEthernet half call, the access part includes: network side state machines for the originating and terminating call sides, an interface resource pool or channel pool, an encoder and a decoder between octet coded and symbolic layer 3 messages, and equipment enabling communication to the access unit. In the WAN half call, the access part includes: state machines for controlling protocol on the WAN interface card for originating and terminating sides of a call, a resouce pool reserved for use when bonding channels together to one broadband channel, a call set-up server to access unit connection, an encoder and a decoder between symbolic messages and the packed message to/from the WAN interface card software, equipment enabling communication to the WAN interface card, and a representation of the WAN interface card.

Different parts are also provided as user parts in the IsoEthernet and WAN half calls. The IsoEthernet user part includes: the IsoEthernet service pointer, state machines for the user dependent part of the originating and terminating basic call service, a user information object, and the geographical limitation of a WAN call checker. The WAN user part includes: the WAN service pointer, state machines for the user dependent part of the originating and terminating basic call service, and the WAN user information object.

The basic call referred to above is a call that does not require any auxiliary devices in the network and does not have any information as to what kind of data the connection (data path) transports. The basic call is the most generic telecommunication service. The central part of the application architecture contains the state machines for the central part of originating and terminating basic call service and is common to both call halves, the isoEthernet call half and the WAN call half.

To ensure that new services and physical equipment can be added to the multimedia system according to the present invention, so that it offers application modularity, etc., several well defined interfaces are provided. These interfaces include: the user-access interface 365, the central service-user interface 375, the interface 385 between call halves, and the interface 315 towards the connection handling portion 320.

Figure 11A:
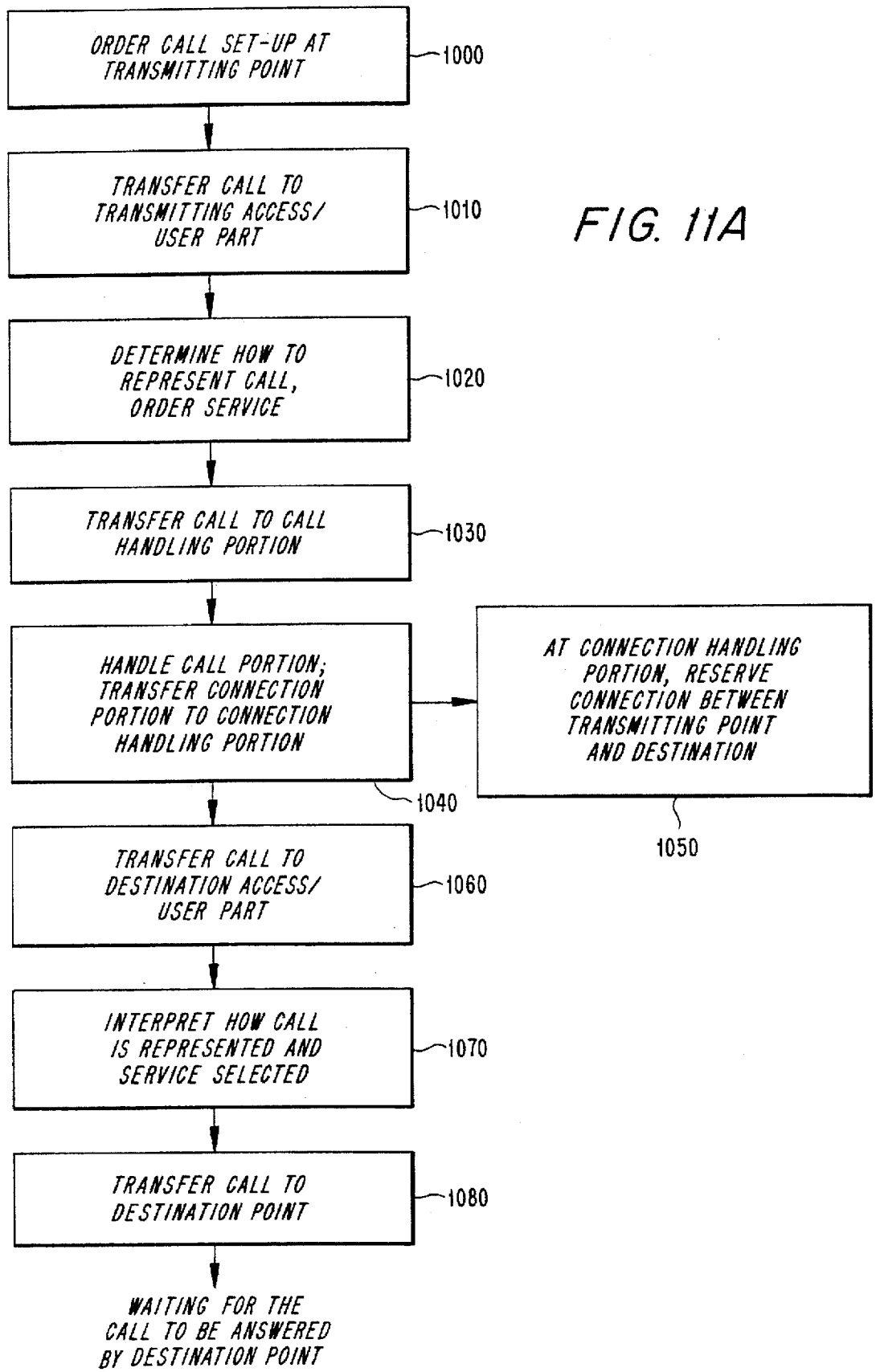

Flowcharts illustrating how a call and an answer may be transferred according to the present invention are depicted in FIGS. 11A and 11B. As shown in FIG. 11A, at step 1000 an order is set up at a transmitting point for transferring a call to a destination point. The transmission point and destination point can, for example, be two terminals, a terminal and a network, or a network and a terminal. The order to set up a call includes a destination number and information representing what type of service is desired.

Next, at step 1010, the call is transferred from the transmitting point to the transmitting access/user part. At step 1020, the transmitting access/user part determines how the call and the physical equipment ordering the call should be represented, determines if the destination number is a valid number, determines if the user ordering the call is authorized to order the call, and selects a service. The data is transferred at step 1030 to a call handling portion. As explained above with reference to FIG. 6, the call includes a call portion representing the actual data to be transferred and a connection portion representing connection points. At step 1040, the call handling portion handles the call portion, including performing the selected service. The call handling portion transfers the connection portion to the connection handling portion, ordering the connection handling portion to reserve a connection. At step 1050, the connection handling portion reserves a connection path for the call, based on the connection points represented by the connection portion. The call is then transferred at step 1060 from the call handling portion to a destination access/user part. At step 1070 the destination access/user part interprets how the call is represented, identifies the user at the transmitting end, determines whether or not the user at the destination end is authorized to receive the call, and determines the service that has been selected. Then, at step 1080, the call is transferred to the destination point.

At this point, the system is waiting for the call to be answered by the destination point. As shown in FIG. 11B, the call is answered by the destination point at step 2000. The answer includes information about the destination point. The answered call information is transferred to the destination access/user part at step 2010. Next, the destination access/user part determines how the answered call information should be represented at step 2020. The answered call information is then transferred at step 2030 to the call handling portion. The answered call information includes a call portion representing the actual answered call data to be transferred and a connection portion representing connection points. At step 2040, the call handling portion handles the call portion, including performing the selected service. The call handling portion then transfers the connection portion to the connection handling portion, ordering the connection handling portion to set up a connection. At step 2050, the connection handling portion sets up a connection path for the call, based on the reserved end points. The answered call information is then transferred at step 2060 from the call handling portion to the transmitting access/user part. At step 2070 the transmitting access/user part interprets how the answered call information is represented. Finally, at step 2080, the answered call information is transferred to the transmitting point. At this point, the connection is established, and the system is waiting for further actions from the transmitting point or the destination point, e.g. release of the established connection.

For example, referring to FIGS. 2, 9 and 10, assume a call is ordered to be set up from the network terminal 100 to the WAN. The call is transferred to the the user access portion 330 in the call set-up server 300. The call-setup server 330 includes the access related part 360 and the user related part 370. The user access portion 330 determines how to represent the call and orders a service. Next, the call is transferred to the call handling portion 310, which includes both the user central part 380 and the WAN central part 380', which communicate with each other across call dialogue interface 385. The call handling portion 310 handles the actual data portion of the call. The connection portion of the call is transferred to the connection handling portion 320 across interfaces 315 and 315'. The connection handling portion 320 reserves a connection path between the transmitting point and the destination point and transfers the connection information to the connection path 800. Then, the call is transferred to the network access portion 340 which includes the WAN access related part 360' and the WAN user related part 370'. The network access portion 340 interprets how the call is represented and the service that has been selected. Finally, the call is transferred to the WAN.

When the WAN answers, answered call information is transferred to the network access portion 340, which includes the WAN access related part 360' and the WAN user related part 370'. The network access portion 340 determines how to represent the answered call information. Next, the answered call information is transferred to the call handling portion 310, which includes both the WAN central part 380' and the user central part 380, which communicate with each other across call dialogue interface 385. The call handling portion 310 handles the actual data portion of the answered call information. The connection portion of the answered call information is transferred to the connection handling portion 320 across interfaces 315 and 315'. The connection handling portion 320 sets up a connection based on the reserved end points and transfers the connection information to the connection path 800. Then, the answered call information is transferred to the user access portion 330 which includes the access related part 360 and the user related part 370. The user access portion 330 interprets how the answered call information is represented. Finally, the answered call information is transferred to the user, and the connection is complete.

According to the present invention, as described above, a communication network system is provided which overcomes the problems of the prior art. By separating service terminal behavior from the service ordered, it is possible to add new terminals without developing/changing existing services. By separating the call handling and connection handling, the connection handling hardware and software can be upgraded without affecting the rest of the system, and the type of transmission backbone can be changed without affecting the call handling portion. For example, the type of backbone may be ATM (Asynchronous Transfer Mode), MVIP (Multivendo Integration Protocol) or any type of high speed LAN. Finally, a service pointer is provided which permits supplementary services to be added, removed, or modified and permits access parts to be added or modified, without affecting already existing services and accesses, and allows interaction between services without affecting the rest of the system.

It will be understood that the invention is not limited to particular embodiments that have been described and illustrated. For example, the invention can also be employed for applications within IsoEthernet terminals. This invention further contemplates any and all modifications that fall within the spirit and scope of the following claims.

What is claimed is:

1. A method of a setting up a call in a communications network from a transmitting point to a destination point, the method comprising the steps of:

ordering the call to be transferred from the transmitting point, transferring the call from the transmitting point to a transmitting access part, for determining how the call should be represented and selecting a service, transferring the call, which includes a call portion representing the actual data to be transferred and a connection portion representing connection points, from the transmitting access part to a call handling portion, handling the call portion in the call handling portion, including performing the selected service, and transferring the connection portion to a connection handling portion, reserving a connection between the connection points represented by the connection portion in the connection handling portion, transferring the call portion from the call handling portion to a destination access part, interpreting how the call is represented and the service that has been selected in the destination access part, transferring the call to the destination point, answering the call in the destination point, transferring answered call information from the destination point to the destination access part, for determining how the answered call information should be represented, transferring the answered call information, which includes an answered call data portion representing the actual answer data to be transferred and an answered connection portion representing reserved connection points, from the destination access part to a call handling portion, handling the answered call data portion in the call handling portion, and transferring the answered connection portion to the connection handling portion, setting up a connection between the reserved connection points represented by the answered connection portion in the connection handling portion, transferring the answered call data portion from the call handling portion to the transmitting access part, interpreting how the answered call information is represented in the transmitting access part, and transferring the answered call information to the transmitting point.

2. The method of claim 1, wherein since the call handling portion handles the call portion and the connection handling portion reserves and sets up the connection, upgrading of the connection handling portion can be performed without affecting call handling.

3. The method of claim 1, wherein the data comprises multimedia data.

4. A call set-up server for setting up a call in a communication network from a transmitting point to a destination point, the call set-up server comprising:

a transmitting access part for receiving the call from the transmitting point, determining how the call should be represented, and selecting a service;

a call handling portion for receiving the call from the transmitting access part, wherein the call includes a call portion representing the actual data to be transferred and a connection portion representing connection points, and the call handling portion handles the call portion, including performing the selected service;

a connection handling portion for receiving the connection handling portion of the call from the call handling portion and reserving the connection between the connection points represented by the connection portion;

a destination access part for receiving the call portion from the call handling portion and interpreting how the call is represented and the service that has been selected;

wherein the call is transferred to the destination point, the call is answered in the destination point, answered call information, which includes an answered call data portion representing the actual answer data to be transferred and an answered connection portion representing reserved connection points, is transferred from the destination point to the destination access part which determines how the answered call information should be represented, the answered call information is transferred from the destination access part to the call handling portion, the call handling portion handles the answered call data portion and transfers the answered connection portion to the connection handling portion, the connection handling portion sets up a connection between the reserved connection points represented by the answered connection portion, the call handling portion transfers the answered call data portion to the transmitting access part, the transmitting access part interprets how the answered call information is represented, and the answered call information is transferred to the transmitting point.

5. The call set-up server of claim 4, wherein the call handling portion handles the call portion and the connection handling portion reserves and sets up the connection thereby upgrading of the connection handling portion can be performed without affecting call handling.

6. The call set-up server of claim 4, wherein the data comprises multimedia data.

* * * * *